(12) United States Patent
Yu et al.

(10) Patent No.: US 8,869,051 B2
(45) Date of Patent: Oct. 21, 2014

(54) SYSTEMS AND METHODS FOR USING SEPARATE EDITING APPLICATIONS FROM WITHIN ELECTRONIC CONTENT CREATION APPLICATIONS WHILE PREVENTING DATA LOSS

(75) Inventors: Fan Yu, Cupertino, CA (US); Mariko Ogawa, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 587 days.

(21) Appl. No.: 12/572,760

(22) Filed: Oct. 2, 2009

(65) Prior Publication Data

US 2013/0326377 A1 Dec. 5, 2013

(51) Int. Cl.
*G06F 3/048* (2013.01)
*G09G 5/00* (2006.01)

(52) U.S. Cl.
USPC ............ 715/763; 715/765; 715/766; 345/619

(58) Field of Classification Search
USPC .......................... 345/619; 715/763, 765, 766
See application file for complete search history.

(56) References Cited

U.S. PATENT DOCUMENTS

| | | | | |
|---|---|---|---|---|
| 5,664,208 | A * | 9/1997 | Pavley et al. ................... | 715/209 |
| 6,061,696 | A * | 5/2000 | Lee et al. ......................... | 715/209 |
| 6,813,621 | B1 * | 11/2004 | Taylor et al. ........................... | 1/1 |
| 7,155,444 | B2 * | 12/2006 | Krishnan et al. ....................... | 1/1 |
| 7,320,109 | B1 | 1/2008 | Zeevi et al. | |
| 7,322,013 | B1 * | 1/2008 | Benson et al. ................. | 715/837 |
| 2002/0069204 | A1 * | 6/2002 | Kahn et al. ...................... | 707/10 |
| 2002/0116416 | A1 * | 8/2002 | Tesch et al. .................... | 707/516 |
| 2003/0097491 | A1 * | 5/2003 | Burbidge ....................... | 709/331 |
| 2004/0205644 | A1 | 10/2004 | Shaughnessy et al. | |
| 2006/0136477 | A1 * | 6/2006 | Bishop et al. .................. | 707/102 |
| 2007/0055936 | A1 | 3/2007 | Dhanjal et al. | |
| 2007/0126732 | A1 * | 6/2007 | Robertson et al. ............. | 345/419 |
| 2007/0136662 | A1 * | 6/2007 | Khaba ........................... | 715/530 |
| 2007/0200873 | A1 * | 8/2007 | Hsu ................................ | 345/629 |
| 2008/0184139 | A1 | 7/2008 | Stewart et al. | |

OTHER PUBLICATIONS

"Photoshop CS4: The Missing Manual", Snider, O'Reilly Media, Inc., 2008, Chapter 3, section 3.1.2.*
Burger, Macromedia-Dreamweaver—Customizing Templates with Dreamweaver and Fireworks; Adobe Tutorial; pp. 1-4, 1999.
Public Forum Discussion 2004 (DW/FW MX 2004—Roundtrip Editing a Template—HighDots Forums), obtained from http://www.highdots.com/forums/macromedia-dreamweaver/dw-fw-mx-2004-roundtrip-76, 2004, pp. 1-9.

(Continued)

*Primary Examiner* — Tadesse Hailu
*Assistant Examiner* — Eric J Bycer
(74) *Attorney, Agent, or Firm* — Kilpatrick Townsend & Stockton LLP

(57) ABSTRACT

Systems and methods are disclosed that facilitate launching separate editing applications from within an electronic content creation application. A content creation application can provide one or more launch editing features for launching separate editing applications to edit the objects or object parts within content that is being created. Such launch editing can involve the content creation application analyzing one or more selected objects and/or object parts and identifying which portions should be sent to a separate editing application. The separate editing application modifies the portions and returns modified portions to the content creation application where the modified portions are incorporated or merged into the electronic content being created.

21 Claims, 12 Drawing Sheets

(56) References Cited

OTHER PUBLICATIONS

Merry, Roundtrip Edits Between Acrobat 3D and the 3D Toolkit, Aug. 2007, Adobe Tutorial, obtained from http://blogs.adobe.com/mfg/2007/08/roundtrip_edits_between_acroba.html, pp. 1-2.

Baker, Planet PDF—Round-trip Editing an Image with Acrobat 7, obtained from, http://www.planetpdf.com/creative/article.asp?ContentID=Round-tripEditinganImagewit, 2005, pp. 1-3.

Kyrnin, Macromedia Studio 8, A First Look, The Latest Release of Dreamweaver, Flash, and Fireworks, obtained from, http://webdesign.about.com/od/dreamweaver/a/aa080805.htm.

Non Final Office Action in U.S. Appl. No. 12/271,372, dated Jul. 24, 2012, pp. 1-19.

* cited by examiner

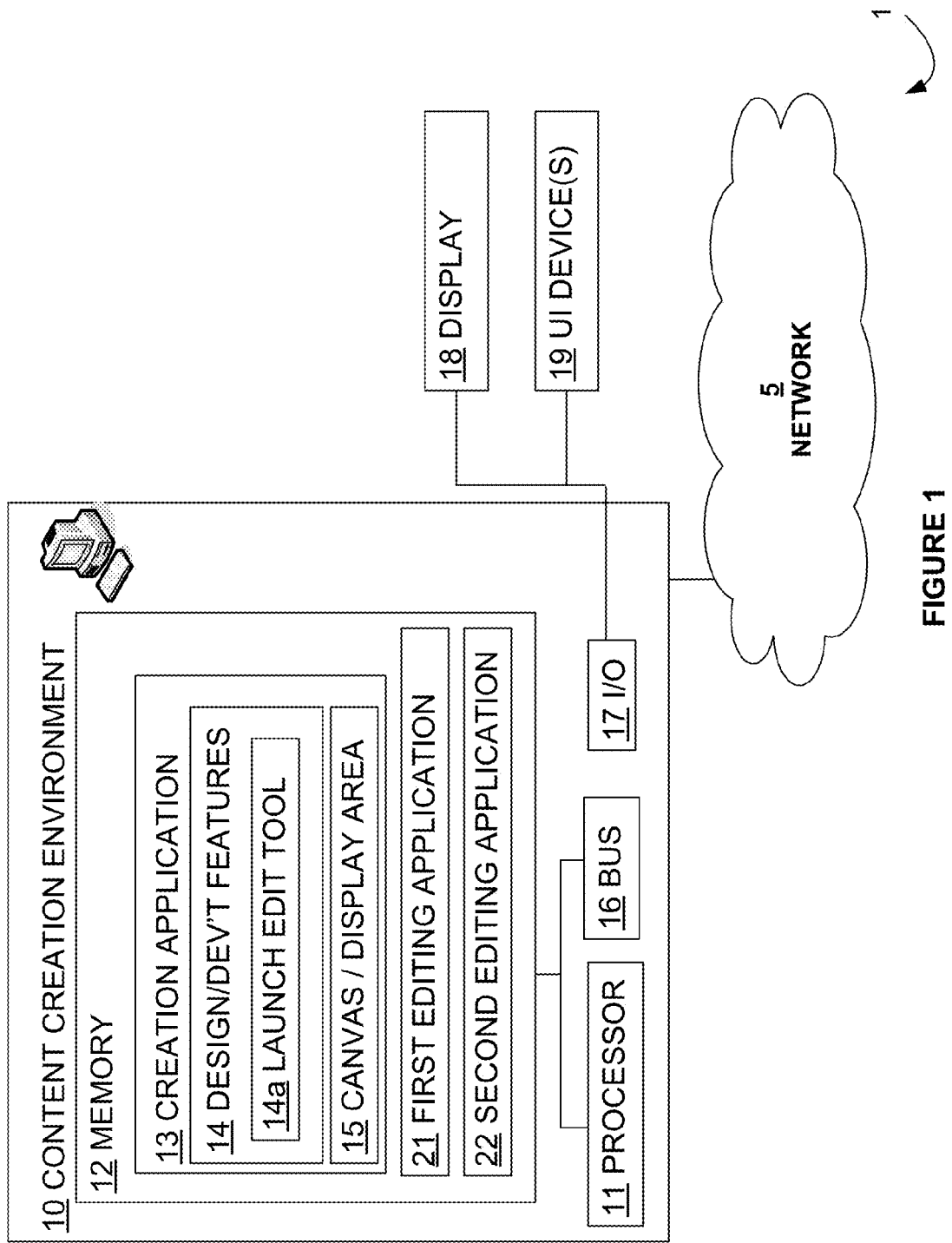

SYSTEMS AND METHODS FOR USING SEPARATE EDITING APPLICATIONS FROM WITHIN ELECTRONIC CONTENT CREATION APPLICATIONS WHILE PREVENTING DATA LOSS

FIELD

This disclosure generally relates to computer software that creates, edits, runs, displays, provides, or otherwise uses electronic content.

BACKGROUND

Various computer applications are used to create and edit electronic content for use on computers and other electronic devices. Such content creation applications typically provide a canvas area which is used to display for editing purposes the positions and sometimes movements and interactivity of objects that are included in electronic content being created. For example, a content creator may develop interactive electronic content that includes buttons, shapes, graphics, animations, videos, and other objects by positioning and editing the appearance of such objects on a canvas area of a content creation application.

Some types of objects and object parts that are included in content being developed cannot be edited on a canvas area. For example, the functionality of a button object may be specified separately from the appearance of the button, which is displayed on the canvas. Moreover, some objects or object parts cannot be edited directly within the content creation application at all. For example, a content application may allow the inclusion of bitmap and vector graphics but provide no direct mechanism or limited features for editing such graphics from within the content creation application. When a content creator desires to edit such graphics, a separate application must generally be used. Some content creation applications allow a creator to launch separate editing applications from within the content creation application. However, generally, existing methods for such "launch editing" can be burdensome and confusing to content creators. Existing applications typically require the content creator to know which objects and/or object parts can be edited by a specific editing application and then to identify those specific parts. This can be particularly burdensome and problematic in circumstances involving complicated content such as content that involves objects with multiple parts, content with a layer having multiple objects, and content having multiple layers. The complexity can result in, among other things, data being lost when a content creator uses a launch editing feature.

Additionally, existing mechanisms for launch editing are typically tailored to individual editing applications. Because each editing application has its own data formatting techniques, launch editing can further result in loss of data where an editing application is inadvertently sent data that is incompatible with its own data formatting. Generally, existing content creation applications fail to provide flexibility with respect to launch editing and are burdensome with respect to requiring that content creators manually select object data that is sent for editing.

SUMMARY

Systems and methods are disclosed that facilitate launching editing applications from within an electronic content creation application. A content creation application can provide one or more launch editing features for launching separate editing applications to edit the objects or object parts within content that is being created. Such launch editing can involve the content creation application analyzing one or more selected objects and/or object parts and identifying which portions should be sent to a separate editing application. The separate editing application modifies the portions and returns modified portions to the content creation application where the modified portions are incorporated or merged into the electronic content being created.

One exemplary embodiment comprises a method of using an editing application from within a content creation environment that involves providing a user interface for creating electronic content, the user interface comprising a canvas for displaying objects used in electronic content being created and tools for editing the appearance and functionality of those objects. The method further involves receiving input to edit a portion of the electronic content in a separate editing application and analyzing the portion of content to identify objects that are editable in the separate editing application and objects that are not editable in the separate editing application. The method then sends data about the objects that are editable in the separate editing application to the separate editing application, receives data about modifications to the objects that are editable in the separate editing application, and modifies the electronic content based on those modifications.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein:

FIG. 1 is a system diagram illustrating an exemplary computing environment;

DETAILED DESCRIPTION

Figure 2A:
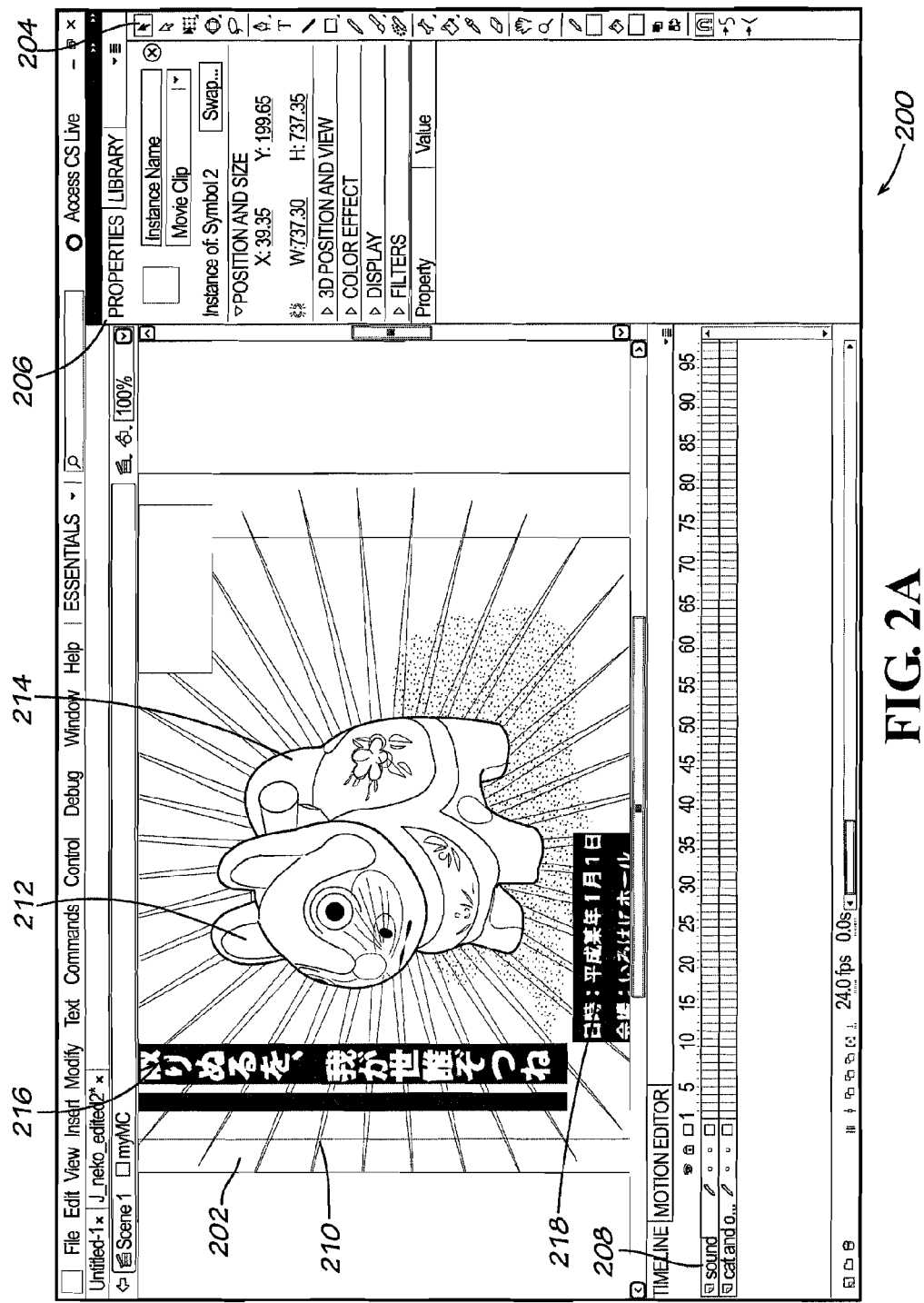
FIGS. 2A-F are screen shots illustrating an exemplary launch editing workflow utilizing features of certain embodiments.

Systems and methods are disclosed that facilitate launching editing applications from within an electronic content creation application. Such launch editing can involve a content creation application analyzing one or more selected objects and/or object parts and identifying which portions should be sent to a separate editing application. This analysis can involve comparing each of the objects or object parts with information about the recipient editing application. Information about a recipient editing application can be stored in the content creation application, e.g., as a predefined data structure, received from the recipient editing application, or otherwise determined. In certain embodiments, data is sent to an editing application using a common interchange format. Such format can be used to determine which types of content to send to a given editing application. The editing application modifies the portions that it receives and returns modified portions to the content creation application where the modified portions are incorporated or merged into the electronic content being created.

As a specific example, if a user selects a group of objects for editing with a vector graphics editing application, the content creation application can identify which objects or object parts can be edited by the vector graphics editing application, and ensure that only those objects or object parts are sent for editing. The content creation application also keeps track of the portions that are sent so that such portions can be merged when they return from editing. The content creation application may restrict use of its creation/editing features while awaiting the return of objects sent for editing in the vector graphics editing application.

One advantage of embodiments in which a content creation application identifies which portions (i.e., objects and object parts) can be sent for editing is that the content creator does not need to do this identification manually. Moreover, a content creator can simply select a group of objects, one or more layers, or even the entirety of the content being developed and launch an editing application that will edit the appropriate objects. Generally, a content creator's creation experience may be improved in a variety of ways and errors that might otherwise result from a content creator manually sending objects for editing may be reduced or eliminated.

These illustrative examples are given to introduce the reader to the general subject matter discussed herein and are not intended to limit the scope of the disclosed concepts. The following sections describe various additional embodiments and examples.

Illustrative Computing Environment

Referring now to the drawings in which like numerals indicate like elements throughout the several Figures, FIG. 1 is a system diagram illustrating an exemplary computing environment. Other computing environments may be also be used. The environment 1 shown in FIG. 1 comprises a wired or wireless network 5 and a connected computing device 10. Exemplary applications that execute on devices are shown as functional or storage components residing in memory 12. The memory 12 may be transient or persistent. As is known to one of skill in the art, such applications may be resident in any suitable computer-readable medium and execute on any suitable processor. For example, device 10 may comprise a computer-readable medium such as a random access memory (RAM) coupled to a processor 11 that executes computer-executable program instructions and/or accesses information stored in memory 12. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic®, Java®, Python®, Perl®, JavaScript®, and ActionScript®.

The network 5 shown comprises the Internet. In other embodiments, other networks, intranets, combinations of networks, or no network may be used. Devices connected by the network 5 may comprise a number of external or internal devices such as a mouse, a CD-ROM, DVD, a keyboard, a display, audio speakers, or other input or output devices. For example, content creation environment device 10 includes a display 18 and various user interface devices 19. A bus, such as bus 16, will typically be included in a computing device.

Content creation environment device 10 includes a content creation application 13 for a creator to create and edit electronic content. The content creation application 13 may include various design and development features 14 and a canvas or display area 15. For example, a creator may position various graphically-displayed objects on the canvas or display area 15 to specify the appearance of the application or other content that is being created. The design and development features 14 may be used to edit and configure these graphically-displayed objects and to add functionality, animation, and event-based interactivity to those objects.

The design and development features 14 of the content creation application 13 on the content creation environment device 10 include one or more launch editing tools such as launch edit tool 14a that allow a content creator to launch a separate application for editing portions of the content that is being created in the content creation application 13. For example, a content creator may select one or more objects or parts of objects on the display area 15 and use the launch edit tool 14a to launch the first editing application 21, which may be used, for example, to edit any bitmap content in the selections. Selecting the launch edit tool 14a may launch the first editing application 21 and provide data about objects or object parts that can be edited to the first editing application 21. Once the content creator has edited those objects, the modified data can be sent back to the content creation application 13 and used to merge the changes with the content that is being developed. Similarly, the launch edit tool 14a or another tool may be used to launch the second editing application, for example, to launch an application to edit vector graphics, sound, video, any other specific type of content, or an application that edits multiple types of content.

The exemplary configuration and uses of this exemplary computing environment are provided merely to illustrate various potential configurations that can be used to implement certain embodiments. Other configurations may of course be utilized.

Exemplary Methods of Launching a Separate Editing Application

An exemplary process of launch editing involves an editing application saving a temporary file from a first application and loading that file into a second application for editing. The second application may display a control bar with a "DONE" button or similar feature that a user can select upon conclusion of the editing to return to the first application. When the "DONE" button or other feature is selected, the second application saves a file to a temporary location and returns control to the first application. The first application accesses the file and converts the information in the file back to the native first application version, updating any older objects with the new information.

This type of exemplary process can provide a variety of benefits for content creators. For example, content creators may import asset files into a content creation application and then later realize that an asset needs to be revised. The content creator can launch the second application to edit the asset from within the content creation application. As another example, a content creator may create a button symbol in a content creation application and use a launch edit feature to edit different states of the button in other editing applications. Content creators may also use a launch edit feature to facilitate frame-by-frame animation editing. Launch editing can also be used to facilitate component skin editing. In one exemplary workflow, a designer creates artwork in a graphics editing application and imports it into a content creation environment to create editable text, a path, a graphic (e.g., bitmap, etc.) and movie clips. The designer can later pick an instance on the canvas of the content editing application to edit using a launch edit feature. The designer may be given an option to edit the original file or the content creation application file. The data associated with the instance is provided to a second editing application and, upon completion of the editing, the data can be saved for use in the content creation application and/or to update the original files.

A content creation application can be configured so that a content creator may only be allowed to select a single element on an editing canvas to start launch editing. This can avoid complexity and performance delay. Such a single selection of an element, however, could involve a container type object that itself contains multiple and different types of objects and layers. Editing of the selected objects and/or the entire content of a content creation application may be locked or otherwise rendered non-editable while editing is occurring in a separately launched editing application. A dialog panel may be displayed in the content creation application indicating that a selection is being edited with another editing application. Such a dialog may provide a cancel button or other option that allows a content creator to end the launch editing process from within the content creation application.

A content creation application may provide various types of data structures to provide information to another editing application. In certain embodiments, a content creation application is able to pass information about multiple layers, multiple frames, both, or neither. In one exemplary embodiment, a content creation application provides one frame (such as the current or visible frame) with a single or multiple layer structure, so that upon editing in an editing application, content creators will see the same items seen and selected on the canvas in the content creation application. If the data structure does not support frames, only a first or selected frame can be provided. A frame may contain symbols that themselves have multiple frames. In that circumstance, only the first frame of each such symbol need be sent.

Certain embodiments select objects and other data from within a selection that will not be transferred to an editing application during a launch editing process. For example, it may not be appropriate to send video, sound, and other specific data, such as inverse kinematics, 3-D properties, and properties relating to motion where the editing application is a graphics editor or other application that cannot edit such information. It may, however, be useful to provide some data about objects that cannot be edited to provide context in the separate editing application, among other things. For example, the content creation environment may send non-editable background colors, images, or graphics to the separate editing application. This non-editable content can be locked (i.e., presented as non-editable content) in the separate application. For example, if the separate editing application allows editing of multilayer objects, a non-editable bottom layer may be used to display the background information. The bottom layer can be provided with an effect, filter, or other visual alteration to indicate that the background information on that layer should not be edited and/or can be, if the editing application allows, identified as content that cannot be edited. In one embodiment, all the visible contents on a canvas or within a selection area is sent either as editable content or as non-editable background content.

An exemplary launch editing process can use various mechanisms to address potential issues resulting in circumstances where additional layers are added to layered content in a separate editing application. In one embodiment, a content creation application sends a layer with a generic layer label such as "selected object to edit," and, if a content creator changes the default layer name in a separate editing application, the content creation application simply adds that new layer with the selected object and deletes the selected object in the previous layer. For example, a content creation may select a symbol in Layer 1, and in an editing application change the layer name from "selected object to edit" to "Layer 1". After returning to the content creation application, "Layer 1-1" can be added with the symbol and the old symbol in Layer 1 can be removed.

The following provide examples of object types that can be edited by particular applications. A bitmap, .tiff, .jpg, .png and .gif object can be edited in Adobe® Photoshop® or Adobe® Fireworks®. A vector object (e.g., a raw shape or drawing object) can be edited in Adobe® Illustrator® or Adobe®Fireworks®. A symbol object may be edited in Adobe® Photoshop®, Adobe® Illustrator® or Adobe® Fireworks®, depending on the contents of the object. A symbol can contain another symbol, bitmap, vector, text in different layers and frames. A selection of a movie clip or graphic symbol with only a bitmap inside may launch Adobe® Photoshop® or Adobe® Fireworks® to edit the bitmap. A selection of a Movie Clip or Graphic symbol with a vector inside may launch Adobe® Illustrator® or Adobe-® Fireworks® to edit the vector. A selection of a group or symbol with a mix of symbols, vectors, bitmaps, and text may launch Adobe® Photoshop®, Adobe® Illustrator® or Adobe® Fireworks®. If a group or symbol contains multiple layers, Adobe® Illustrator® can be selected to address the multiple layers. A selected button may result in the different states of the button being displayed as different layers in a separate editing application. A selection of an animation may result in the different frames of the animations displayed in different layers of a separate editing application. To facilitate object selection, only objects located at the first frame of a multi-frame selection may be sent. Similarly, only visible objects and/or those on a main timeline level may be selected for editing.

FIGS. 2A-G are screen shots illustrating an exemplary launch editing workflow utilizing features of certain embodiments. The user interface 200 shown in FIG. 2A includes a canvas area 202 for laying out objects used in content being created, a toolbar 204 that includes various graphical and other tools for editing content being created, a properties area 206 for viewing and editing properties of selected objects and other features, and a timeline 208 for defining animation, motion, and other features that involve time. Alternative and/or additional features may be included in a content creation application user interface.

Figure 2B:
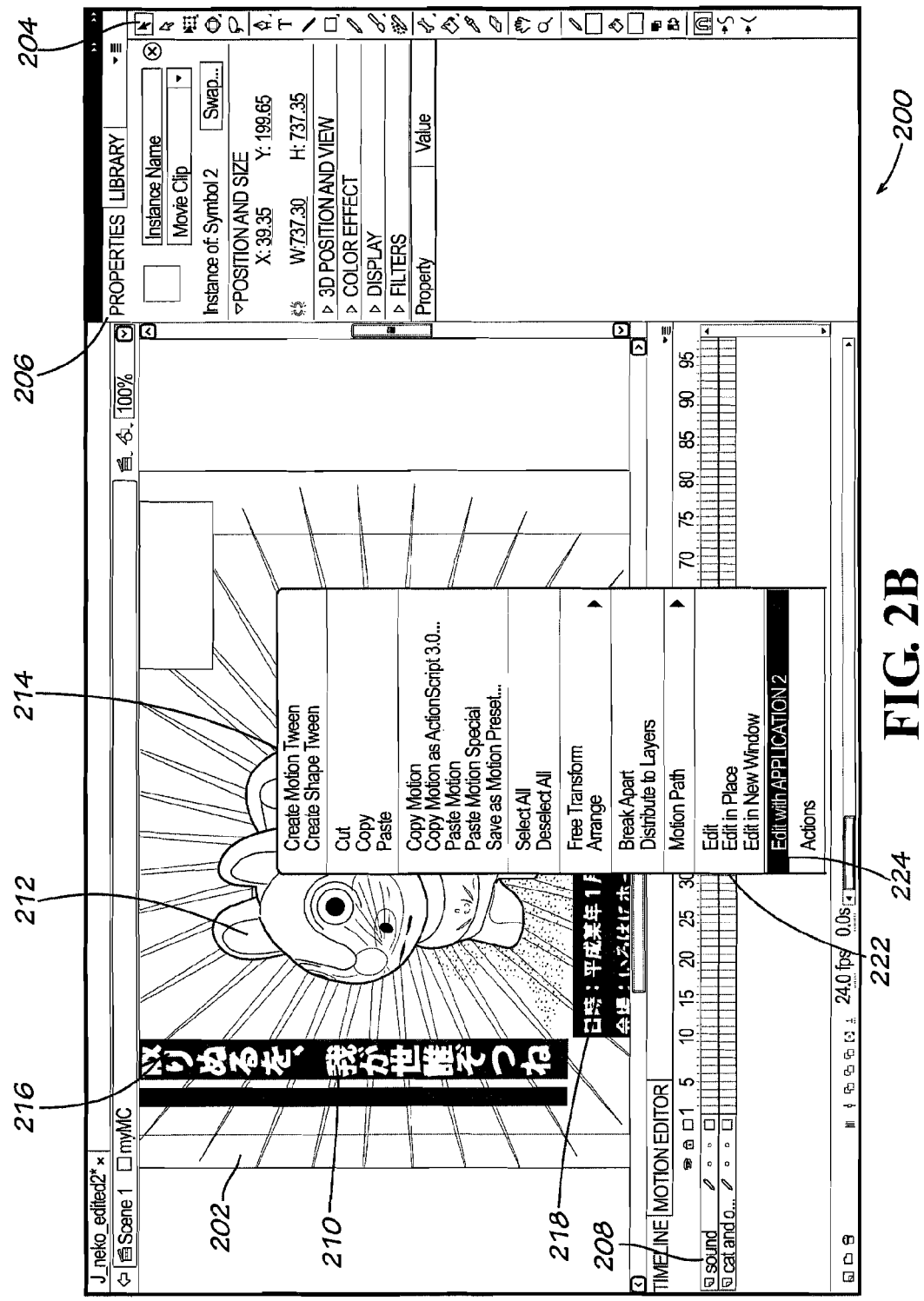

The canvas area 202 of the content creation application user interface 200 displays content that includes various types of objects and objects contained within other objects. In certain content creation applications, a "movie clip" type object is used as a container to contain other objects. In FIG. 2A, container 210 includes a cat graphic 212, a green radial shape design 214 under the cat graphic, and various text objects 216, 218. One or more of these objects may be animated. In FIG. 2B, an exemplary contextual menu 222 is presented for accessing a launch editing process, e.g., launching a separate editing application to edit editable portions of selected content. In this example, the content creator uses a mouse right-click or (ctrl+click) on the container 210 to call contextual menu 222 and then selects the "Edit with APPLICATION 2" option 224. In response, a dialog may be presented to let the user know that a separate application editing process has been initiated. It may also let the user know that the content cannot be edited in the content creation application user interface 200 until the separate editing process concludes or is cancelled.

Figure 2C:
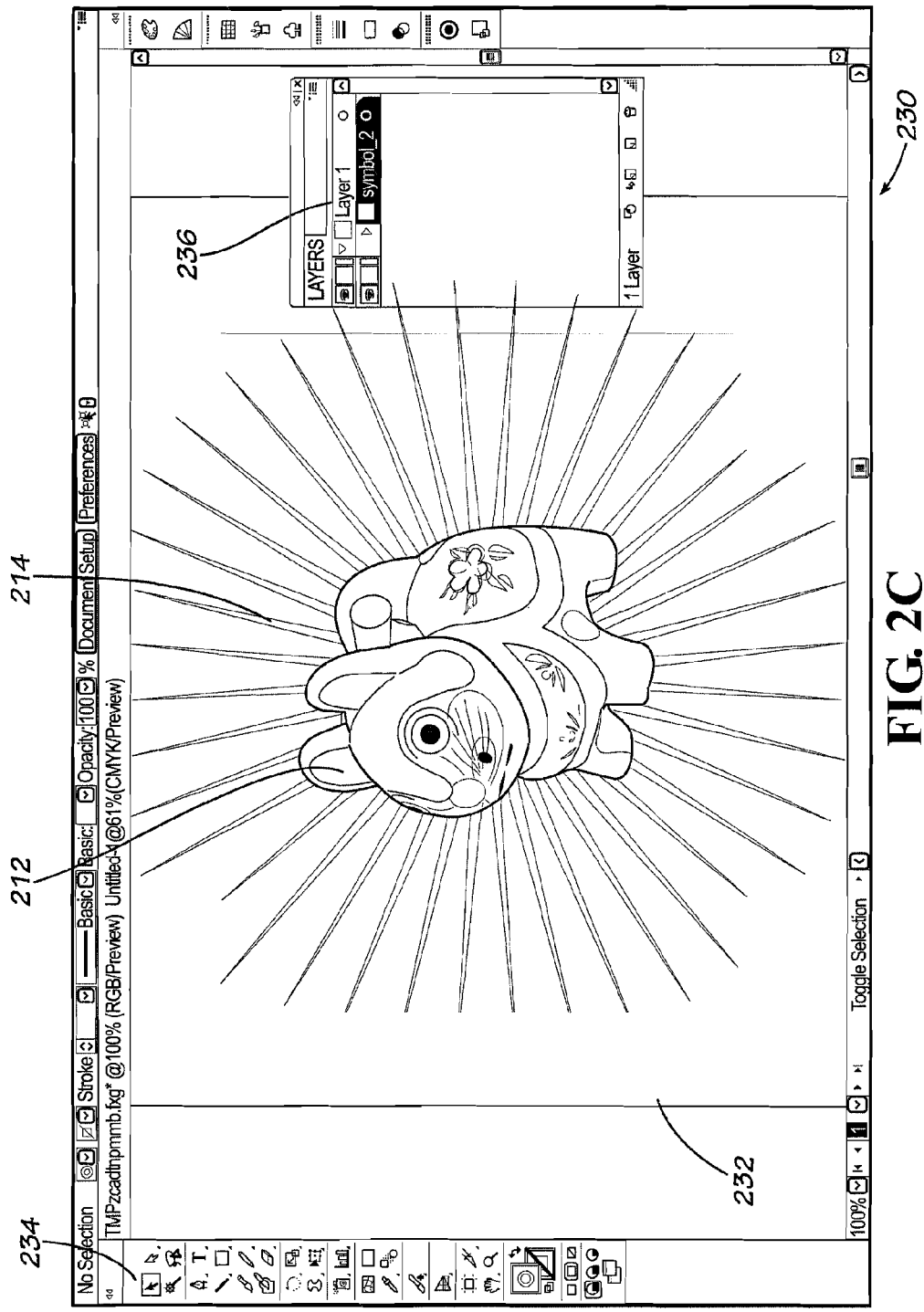

FIG. 2C illustrates a screen shot of the user interface 230 of the separate editing application, "APPLICATION 2," that was launched. The user interface 230 includes a canvas area 232 for laying out objects used in content being created, a toolbar 234 that includes various graphical and other tools for editing, and a layers area 236 for displaying different layers of the content. Alternative and/or additional features may be included in a separate editing application user interface. The canvas area 232 of the separate editing application user interface 230 displays editable objects of container 210, i.e., the cat graphic 212 and the green radial shape design 214 under the cat graphic, but does not display the various text objects 216, 218 of the container 210. The various text objects 216, 218 may not have been sent to the separate editing application based on the capabilities of that application or for any other suitable reason.

Figure 2D:
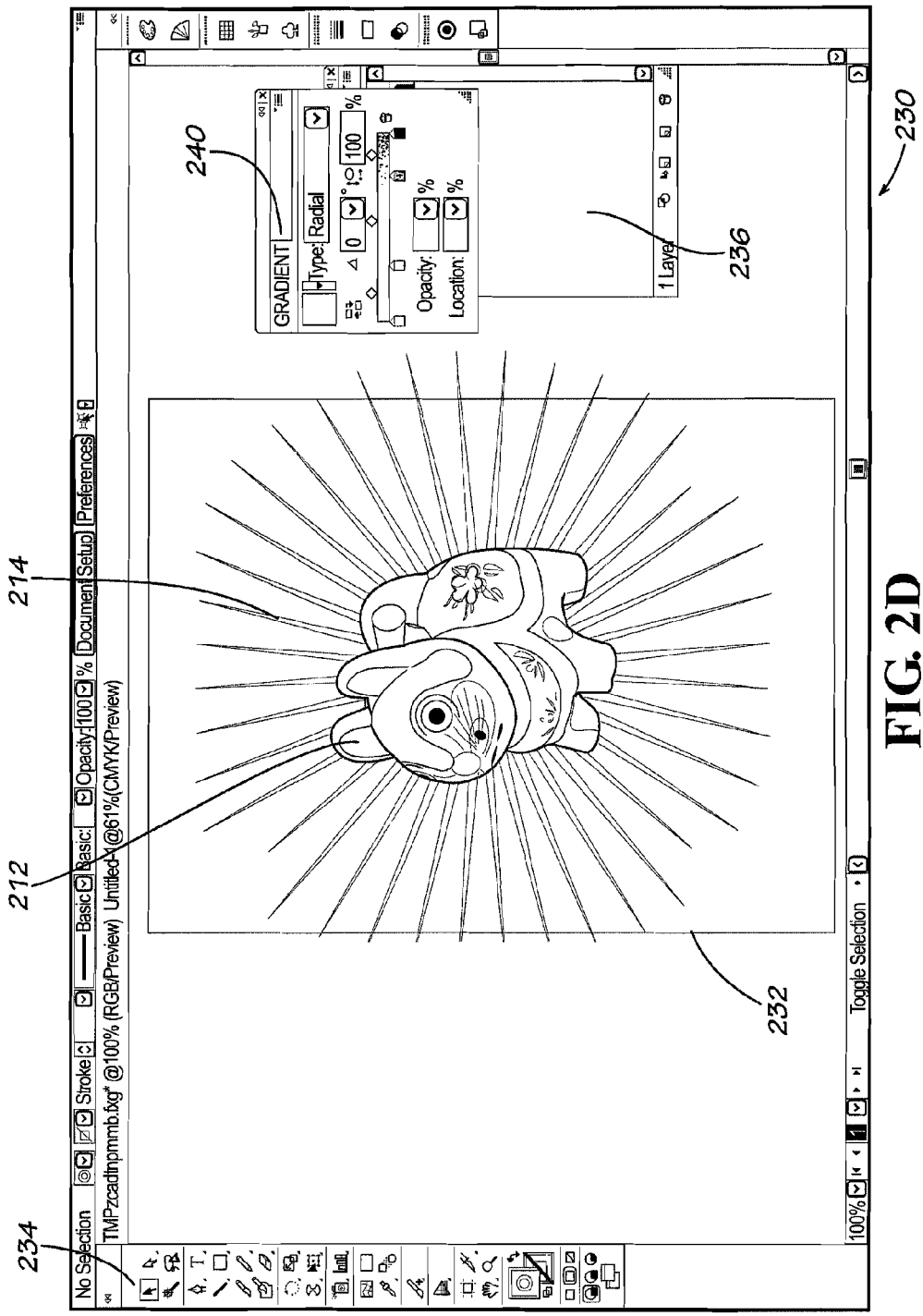
Figure 2E:
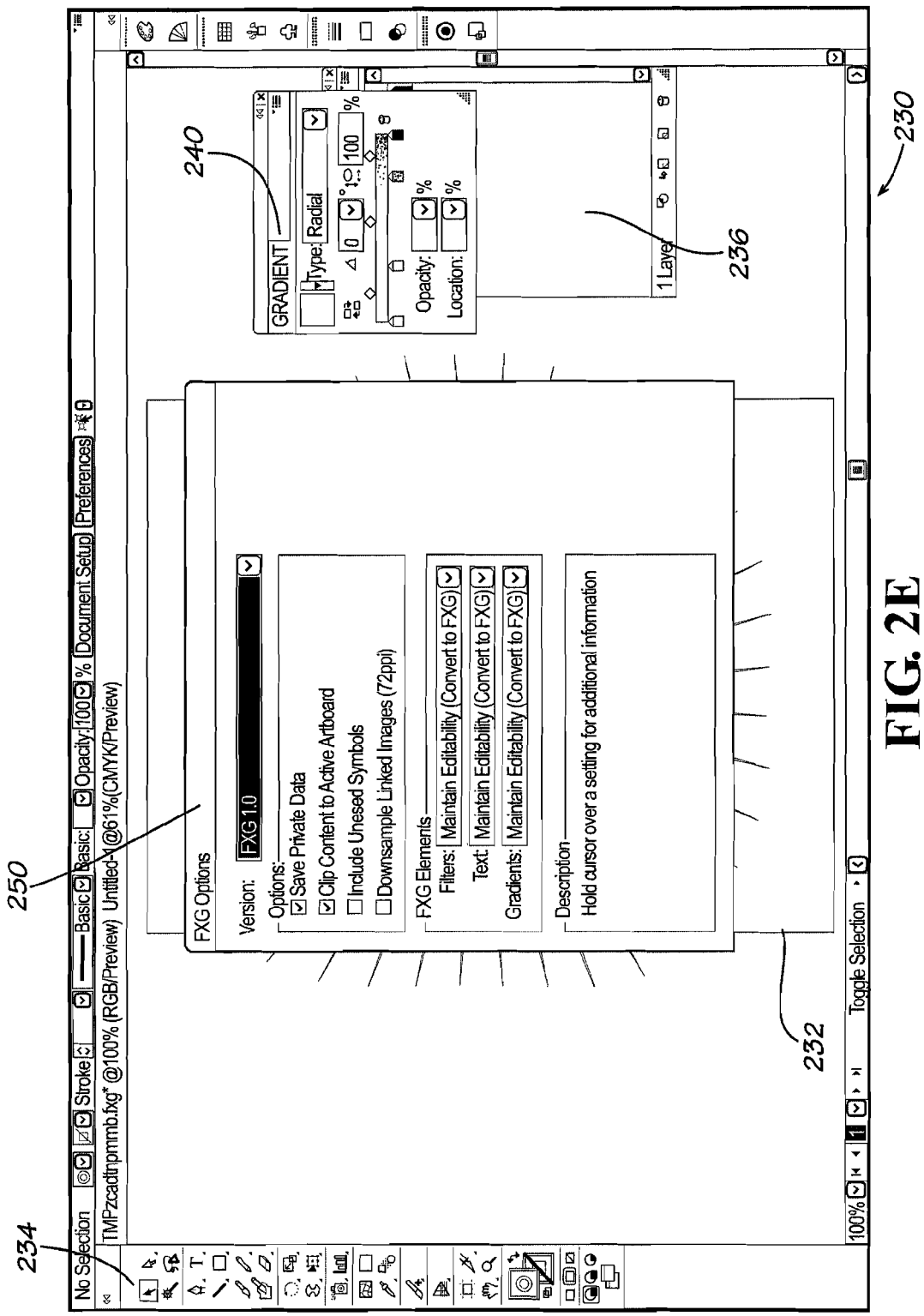

In FIG. 2D, the content creator edits the cat graphic 212 and the green radial shape design 214 to create modified cat graphic 242 and modified radial shape design 244. Such modification may be made, for example, using one of toolbar 234 tools, such as a gradient tool 240. In FIG. 2E, after completing the desired modification, the content creator selects to save the modified content and is presented with a dialog box 250 that allows the content creator to specify various options with respect to returning the modified data to the content creation application. For example, the content creator may select a particular data structure or data structure version to use, whether to save private data, clip content to an active clipboard, whether to include unused symbols, whether to downsample linked images, whether to maintain filters, text, and/or gradients as editable, among other exemplary options. In an alternative embodiment, a content creator returns to the content creation application simply be selecting a button or other control. A simple "DONE" button (not shown) or menu option (not shown) may be selected with the result that modified content is saved for use by the content creation application, the content's use in the separate editing application is ended, and control or focus is passed back to the content creation user interface 200. The content creator may be prompted to accept the changes once back in the content creation application.

Figure 2F:
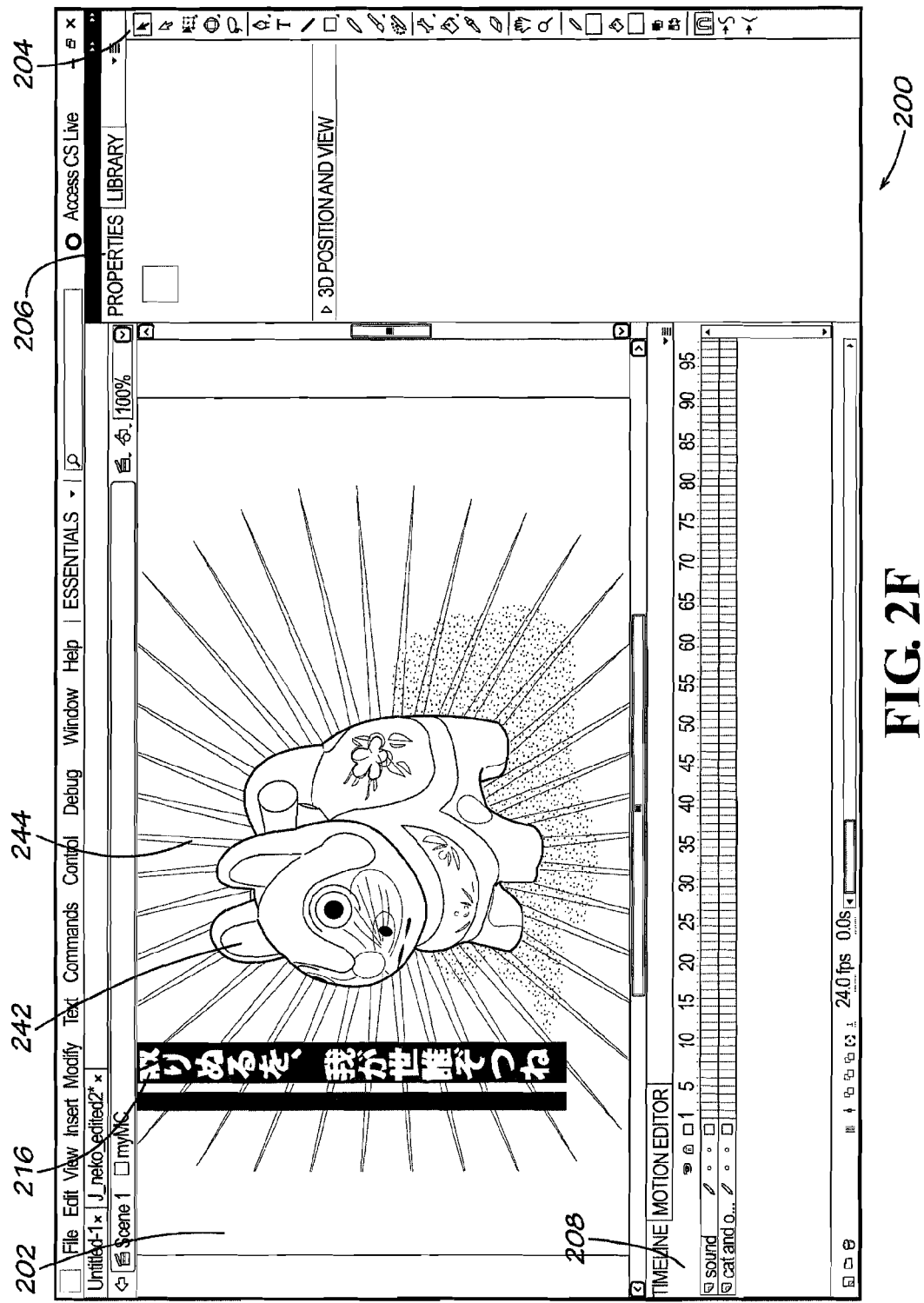

FIG. 2F illustrates the modified cat graphic 242 and modified radial shape design 244 as incorporated or otherwise merged back into the content displayed on the canvas of the content creation application. The order of these merged items has been preserved, i.e., the modified cat graphic 242 is above the modified radial shape design 244 just as the cat graphic 212 was previously above the green radial shape design 214.

FIGS. 3A-E are screen shots illustrating another exemplary launch editing workflow utilizing features of certain embodiments. The user interface 300 shown in FIG. 3A includes a canvas area 302 for laying out objects used in content being created, a toolbar 304 that includes various graphical and other tools for editing content being created, a properties area 306 for viewing and editing properties of selected objects and other features, and a timeline 308 for defining animation, motion, and other features that involve time. Alternative and/or additional features may be included in a content creation application user interface.

Figure 3A:
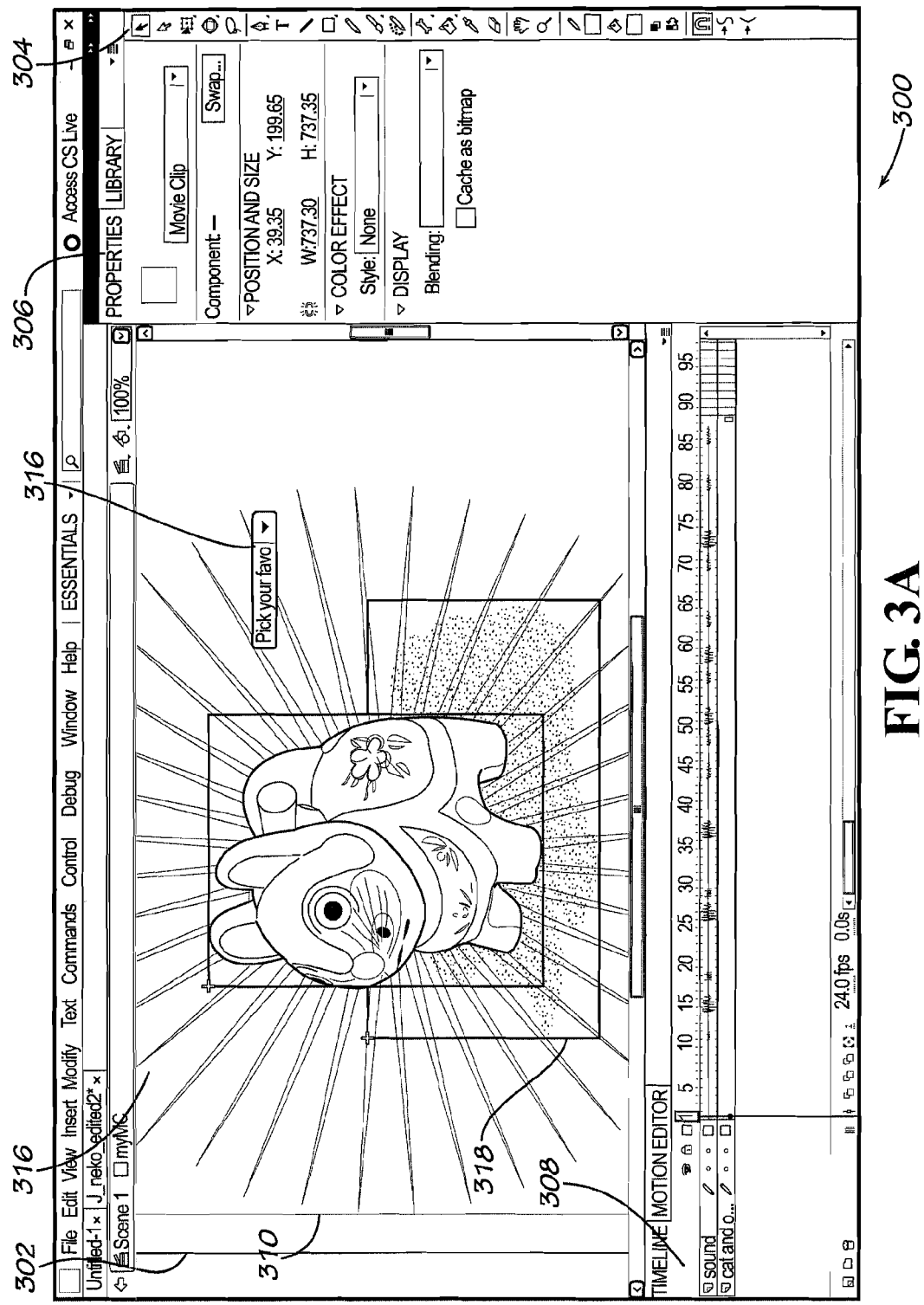
FIGS. 3A-D are screen shots illustrating another exemplary launch editing workflow utilizing features of certain embodiments.

In FIG. 3A, container "MyMC" 310 contains multiple elements including a cat graphic 312, a radial shape design 314, a "pick your favorite" drop-down menu component 316 that contains data, and a movie clip 318. The movie clip 318 has a "multiply" blending mode applied and the radial shape design 314 has a "screen" blending mode applied. In this example, content creator initiates launch editing by selecting the container "MyMc" 310 on the canvas area 302 and then an option (not shown) to edit using a separate application. The content creation application can then analyze the container "MyMC" to identify data that should be sent to the separate editing application and data that should not be sent to the separate editing application. This analysis can be, as examples, based on a predefined data structure into which the data is fitted and/or based on information received (e.g., dynamically) from the separate editing application.

Figure 3B:
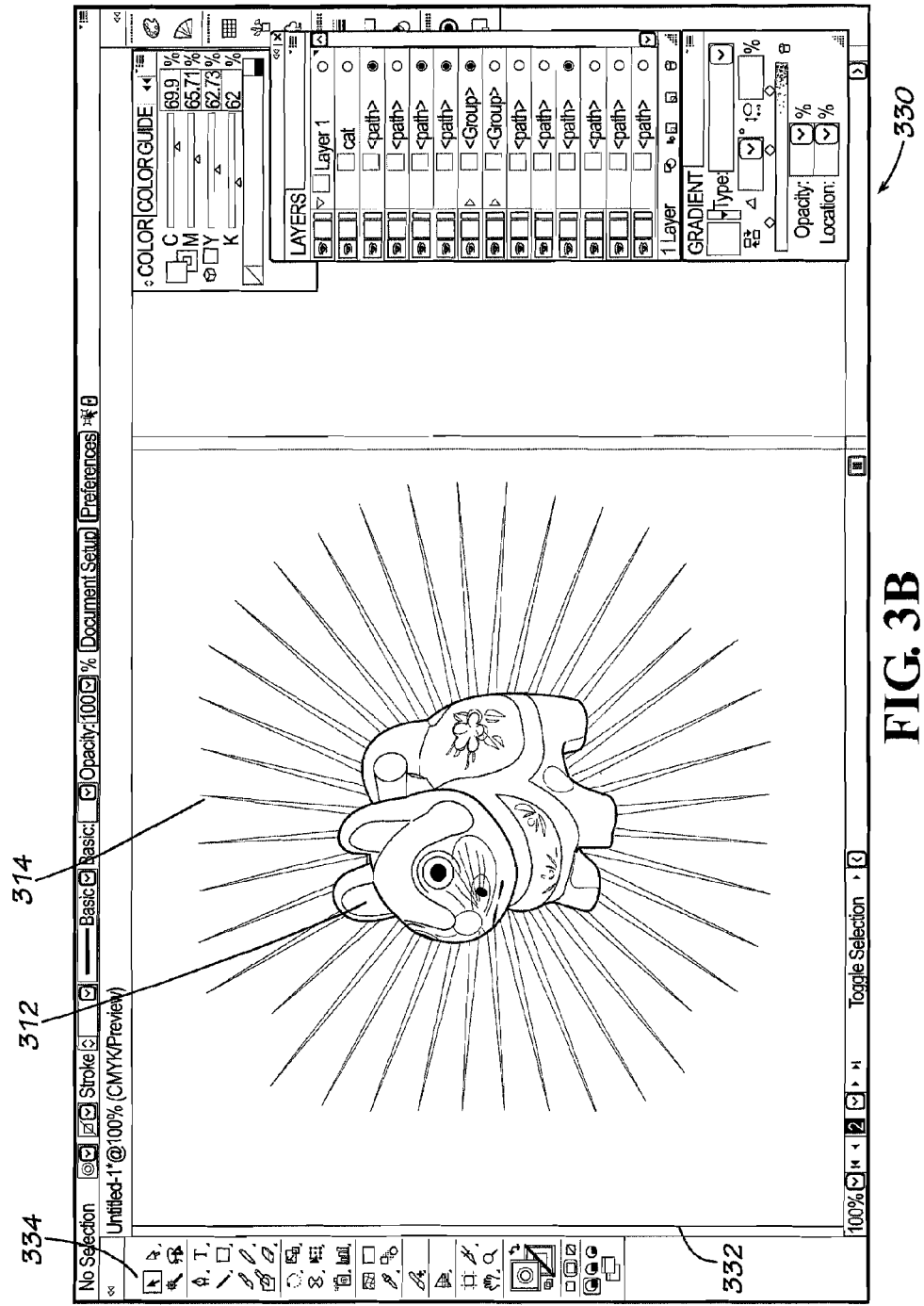

FIG. 3B illustrates a screen shot of the user interface 330 of the separate editing application that was launched. The user interface 330 includes a canvas area 332 for laying out objects used in content being created, a toolbar 334 that includes various graphical and other tools for editing, and a layers area 336 for displaying different layers of the content. Alternative and/or additional features may be included in a separate editing application user interface. The canvas area 332 of the separate editing application user interface 330 displays editable objects of container "MyMC" 310, i.e., the cat graphic 312 and the radial shape design 314 under the cat graphic, but does not display the "pick your favorite" drop-down menu component 316 or movie clip 318. In this example, only elements that can be converted to fit within a specialized data structure are sent for editing in the separate editing application.

Figure 3C:
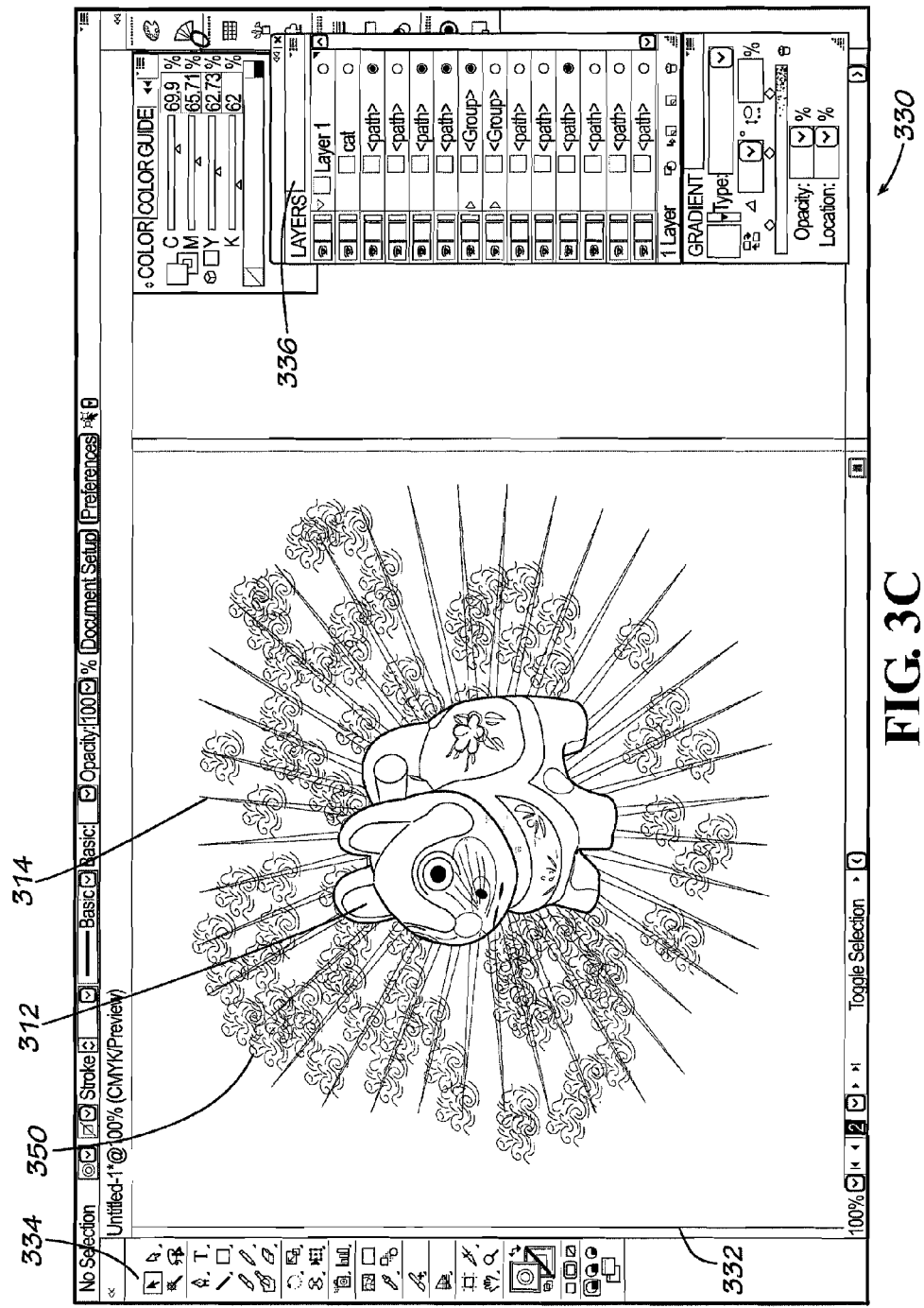
Figure 3D:
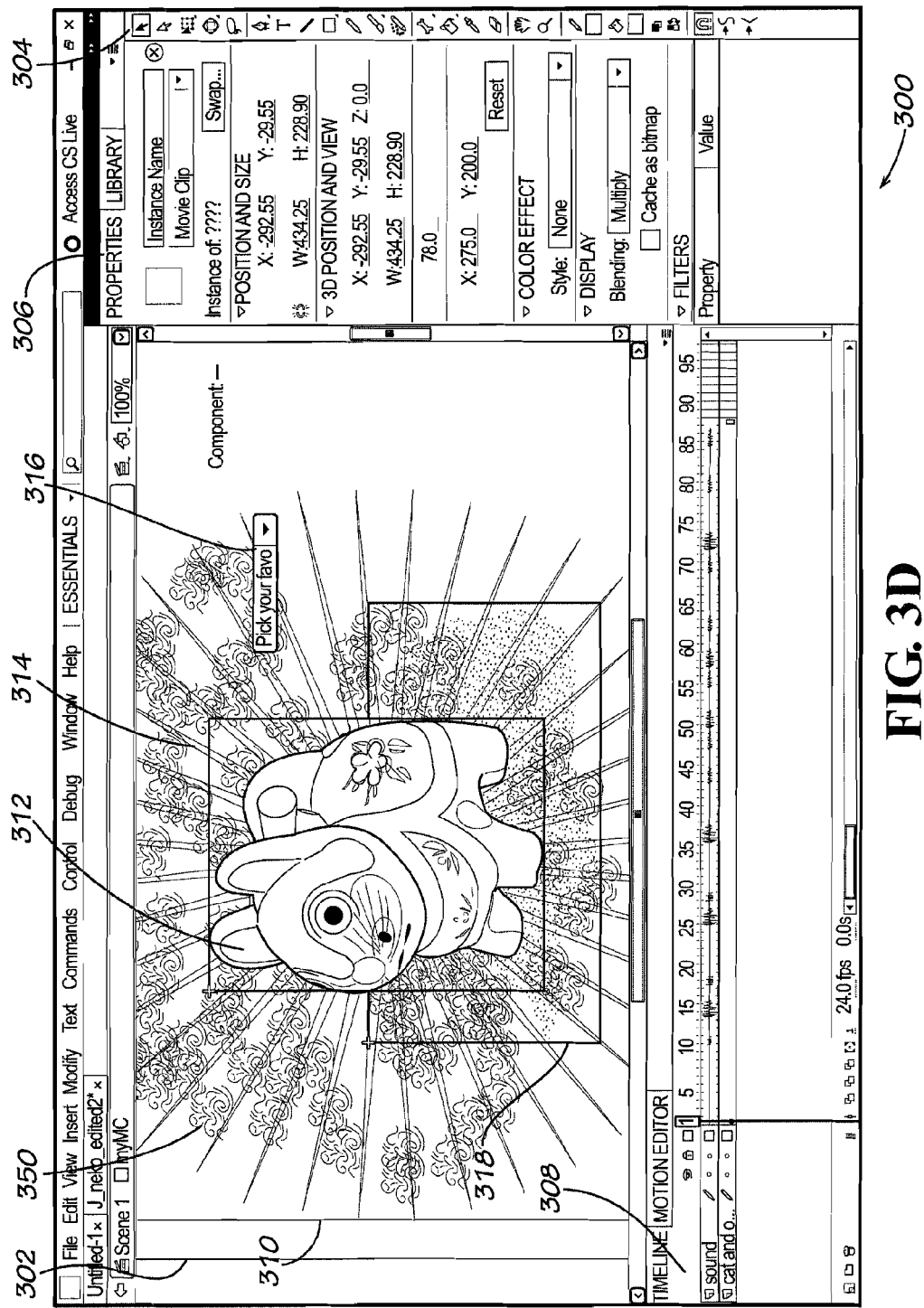

In FIG. 3C, spray brush graphics 360 are added under cat graphic 312 and an option (not shown) is selected to conclude editing and thus return to the content creation application. In FIG. 3D, the container "MyMC" 310 is updated with the edits from the separate editing application. The spray brush group object 352 that is created is positioned below cat design 312, and on top of the rest of the objects, correctly preserving the layering order of the objects. Object or layer order can be maintained when a content application receives a modification from the separate editing application in various ways. For example, to maintain object or layer order, a content application may compare the objects or layers received from the editing application to the original objects or layers sent by the content application. If two objects or layers are determined as the same objects or layer by their names or special flags attached to the objects or layers, then the object or layer received from the editing application will be placed in the same relative location of the original object or layer. Thus the original objects or layers order is retained.

A "screen" blending mode is a property attached to the radial shape design 314 which can also be maintained. If a property of an object in the content creation application can not be edited appropriately in the editing application, it may be kept in the content creation application and not sent to the editing application. However, the object itself may be sent to the editing application for editing. This may allow the content creation application to maintain the properties of the objects during separate editing processes. For example, in the FIG. 3A example, the radial shape design 314 is sent out for editing, but the "screen" blend mode is kept in the content creation application and not sent out. When the content creation application receives the modified radial shape design 314 from the editing application, the content creation application knows to add the "screen" blend mode property to the modified radial shape design 314. Thus, in FIG. 3D, the "screen" blending mode is retained for the radial shape design 314.

Figure 4:
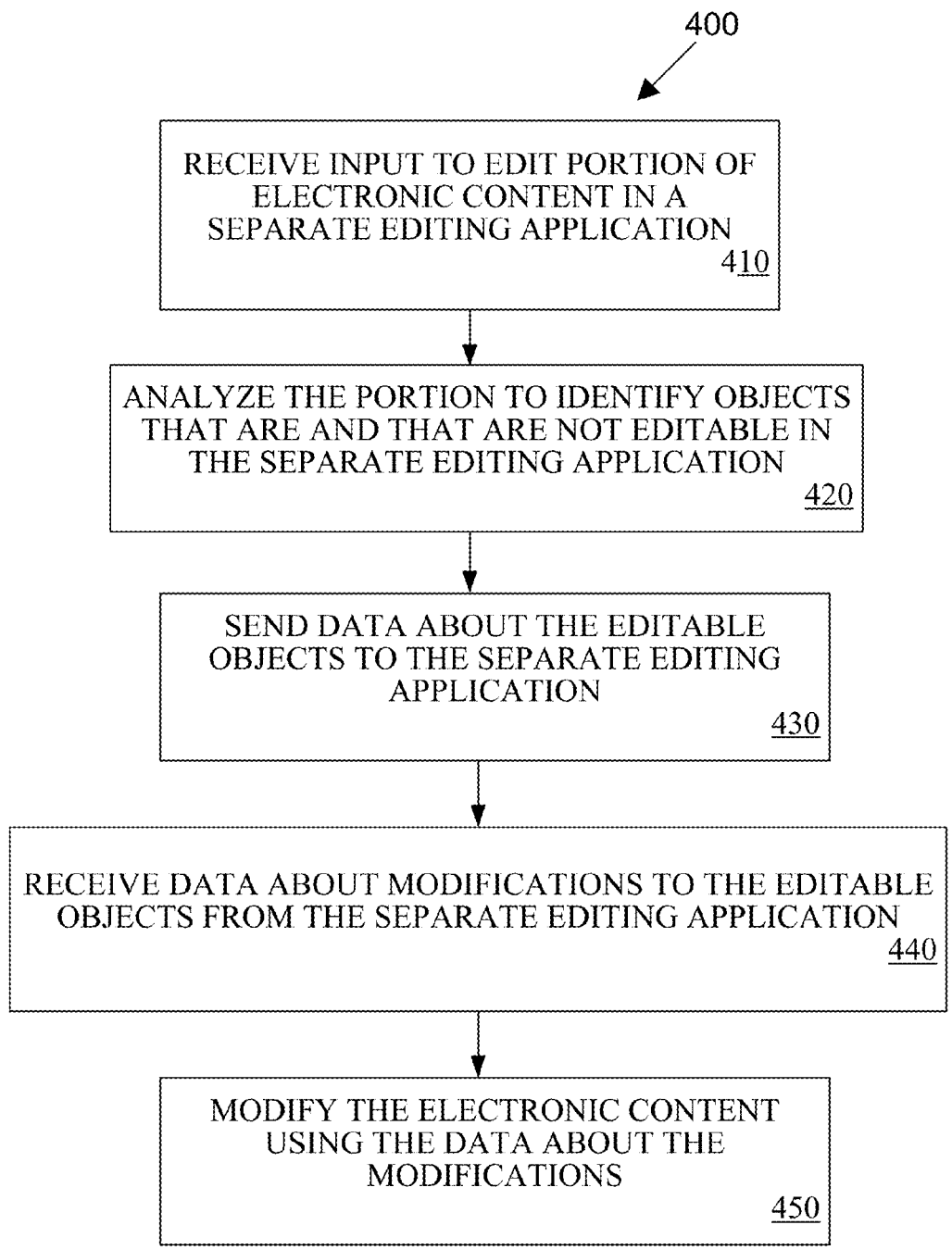
FIG. 4 is a flow chart illustrating an exemplary method of using an editing application from within an electronic content creation application.

FIG. 4 is a flow chart illustrating an exemplary method 400 of using an editing application from within an electronic content creation application. Method 400 can be performed in a variety of computing environments and is typically performed in a content creation application or other environment in which a creator is defining content that is being created or edited, such as content creation environment device 10 of FIG. 1. The method 400 involves receiving input to edit a portion of the electronic content in a separate editing application, as shown in block 410. The portion of the electronic content may be all of the electronic content or less than all of the electronic content. The portion may comprise one or more selected objects. It may comprise a movie clip type object or other container containing one or more objects of different object types.

The method 400 further comprises analyzing the portion of content to identify objects editable in the separate editing application and objects that are not editable in the separate editing application, as shown in block 420. Analyzing the portion of the electronic content may involve using a predefined data structure to determine which objects are editable and which objects are not editable. Such a predefined data structure may comprise a graphics interchange format that define high-level graphical and text primitives that can be used to create, group, transform and visually modify basic vector and bitmap shapes. An exemplary data structure is "FXG," an eXtensible Markup Language graphics file format developed by Adobe Systems Incorporated® and used as a graphics interchange format for cross-application file support.

Analyzing the portion of the electronic content may alternatively involve receiving information from the separate editing application that is used to determine which objects are editable and which objects are not editable. For example, a content creation application may send a message or query to an editing application resident on the same computer device or elsewhere to receive information about the capabilities of that type of editing application.

After analyzing the portion, the method 400 further comprises sending data about the objects that are editable in the separate editing application to the separate editing application, as shown in block 430. In addition to information about the size, shape, and other attributes of an object which may be included, the data about the objects that are editable in the separate editing application can include object positioning data that is used to maintain relative positions of editable objects, non-editable objects, and new objects added in the separate editing application. Positioning data can alternatively or additionally be used to maintain proper layer order of multiple layers within the portion of electronic content. The content creation application may prevent editing of the portion of the electronic content or of the entire content from in the content creation application while awaiting data about modifications to the objects from the separate editing application. The data about the objects that are editable in the separate editing application may also comprise substitute names for one or more objects for use in editing in the separate editing application.

The method 400 further comprises receiving data about modifications to the objects that are editable in the separate editing application, as shown in block 440. For example, if a color of an object is changed, the data about this modification will be reflected in the data about the modifications.

The method 400 further comprises modifying the electronic content based on the modifications, as shown in block 450. In the circumstance in which the portion of content comprises multiple frames and the separate editing application is capable of editing content with multiple layers but not content with multiple frames, some or all of the multiple frames can be provided to the separate editing application for editing as different layers, i.e., where each frame is provided on a different layer. When data about modifications is later received, it is interpreted to apply modifications in different layers as modifications to different frames. In addition, information about an effect applied to an editable object can be maintained in the content creation application and applied with any modifications made to the editable object from the separate editing application.

Data handling can be performed in a variety of ways to facilitate use of the embodiments disclosed herein. Object naming, for example, can be handled in a variety of ways and, among other things, can facilitate the use of the objects in the separate editing application and the merging or other use of the modified content when it returns from the editing application. The original or modified names of symbol, instance, layer, frame, scene, document and other objects can be sent to the separate editing applications. Names and/or other identifying information can be used to merge the modified objects upon their return to the content creation application from a separate editing application.

Generally, the type of data handling may depend on one or both of the format of the data structure used to send objects for editing and the capabilities of the separate editing application. If an editing application cannot receive raw shapes, such shapes can be transformed as drawing objects and then, upon return, broken apart to recover the raw shape. If an editing application can handle 9-slice scaling, the guides for such scaling can be sent to the editing application. If the editing application cannot handle 9-slice scaling, a guide layer showing the 9-slice scaling can be sent for use as reference. If an editing application can handle symbols (i.e., objects that use a registration point), the registration point information can be sent. If not, such registration point information may not be sent. If the editing application can handle stroke (e.g., hairline, solid, dashed, dotted, ragged, stripped, hatched, etc.) information, such information can be sent to the editing application.

An editing application may support some or all of the filters of the content creation application. A content creation application may therefore send filter information as appropriate. In some circumstances, the content creation application may not have a filter that corresponds to a filter applied in an editing application. In this circumstance, the content creation application may convert the filter information, for example, into a flattened bitmap image after editing is complete. Blend mode information (e.g., normal, layer, darken, multiply, lighten, screen, overlay, hard light, add, subtract, difference, invert, alpha and erase) can also be sent in appropriate circumstances and may or may not be converted. In some circumstances, the content creation application may not have a blend mode that corresponds to a blend mode applied in an editing application and can convert such information to provide a flattened bitmap image after the editing is complete. Effects, such as color effects (e.g., brightness, tint, etc.), can also be sent to an editing application in appropriate circumstances. Effects from an editing application that are not available in the content creation application may result in a flattened bitmap image.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
providing a user interface for creating electronic content, the user interface provided by a processor processing instructions stored on a computer-readable medium, the user interface comprising a canvas for displaying objects used in creation of electronic content and the user interface comprising tools for editing the appearance or functionality of the objects;
receiving input to edit a portion of the electronic content in a separate editing application;
identifying objects editable in the separate editing application and objects that are not editable in the separate editing application, the identifying comprising using a predefined data structure that is different than the objects to determine which objects are editable and which objects are not editable;
sending data about the objects that are editable in the separate editing application to the separate editing application;
receiving data about modifications to the objects that are editable in the separate editing application; and
modifying the electronic content based on the modifications.

2. The method of claim 1 wherein the portion of electronic content comprises multiple frames and the separate editing application is capable of editing multiple layers but not multiple frames, wherein a plurality of the multiple frames are provided to the separate editing application for editing, wherein each of the multiple frames is provided as a different layer.

3. The method of claim 2 wherein the data about the modification is interpreted to apply modifications in different layers as modifications to different frames.

4. The method of claim 1 wherein the predefined data structure comprises a graphics interchange format that define high-level graphical and text primitives used to create, group, transform or modify vector or bitmap shapes.

5. The method of claim 1 wherein the identifying further comprises receiving the information from the separate editing application.

6. The method of claim 1 wherein the portion comprises one or more selected objects.

7. The method of claim 1 wherein the portion is a selected container containing one or more objects of different object types.

8. The method of claim 1 wherein information about an effect applied to an editable object is maintained in the content creation application and applied with any modifications made to the editable object in the separate editing application.

9. The method of claim 1 wherein the data about the objects that are editable in the separate editing application comprises object positioning data, wherein the object positioning data is used to maintain relative positions of editable objects, non-editable objects, and new objects added in the separate editing application.

10. The method of claim 9 wherein the object positioning data is used to maintain proper layer order of multiple layers in the portion of electronic content.

11. The method of claim 1 wherein the content creation application is a rich Internet application development application and the separate editing application is a graphics editing application.

12. The method of claim 1 wherein the content creation application prevents editing of the portion of the electronic content in the content creation application while awaiting the data about modifications to the objects.

13. The method of claim 1 wherein the data about the objects that are editable in the separate editing application comprises substitute names for one or more objects for use in editing in the separate editing application.

14. The method of claim 1 wherein the input to edit a portion of the electronic content in a separate editing application comprises a user selection of a group of objects, wherein the portion of the electronic content is the group of objects.

15. The method of claim 1 wherein the predefined data structure comprises a markup language file format that describes two-dimensional vector graphics.

16. The method of claim 1 wherein the predefined data structure describes two-dimensional vector graphics.

17. A computer apparatus comprising:
a processor;
a user interface for creating electronic content, the user interface provided by the processor processing instructions stored on a computer-readable medium, the user interface comprising a canvas for displaying objects used in creation of electronic content and the user interface comprising tools for editing the appearance or functionality of the objects; and
a launch editing component implemented by the processor processing instructions stored on the computer-readable medium, wherein the launch editing component:
receives input to edit a portion of the electronic content in a separate editing application;
identifies objects in the portion of the electronic content editable in the separate editing application and objects in the portion of the electronic content that are not editable in the separate editing application using a predefined data structure that is different than the objects to determine which objects are editable and which objects are not editable;
sends data about the objects that are editable in the separate editing application to the separate editing application;
receives data about modifications to the objects that are editable in the separate editing application; and
modifies the electronic content based on the modifications.

18. The computer apparatus of claim 17 wherein the predefined data structure comprises a graphics interchange format that define high-level graphical and text primitives used to create, group, transform or modify vector or bitmap shapes.

19. The computer apparatus of claim 17 further comprising wherein the portion of content comprises multiple frames and the separate editing application is capable of editing content with multiple layers but not content with multiple frames, wherein the launch editing component provides a plurality of the multiple frames to the separate editing application for editing, wherein each of the multiple frames is provided as a different layer.

20. A non-transitory computer-readable medium on which is encoded program code, the program code comprising:
program code for providing a user interface for creating electronic content, the user interface provided by a processor processing instructions stored on a computer-readable medium, the user interface comprising a canvas for displaying objects used in creation of electronic content and the user interface comprising tools for editing the appearance or functionality of the objects;
program code for receiving input to edit a portion of the electronic content in a separate editing application;
program code for identifying objects editable in the separate editing application and objects that are not editable in the separate editing application, the identifying comprising using a predefined data structure that is different than the object to determine which objects are editable and which objects are not editable;

program code for sending data about the objects that are editable in the separate editing application to the separate editing application;

program code for receiving data about modifications to the objects that are editable in the separate editing application; and program code for modifying the electronic content based on the modifications.

21. The non-transitory computer-readable medium of claim 20 wherein the predefined data structure comprises a graphics interchange format that define high-level graphical and text primitives used to create, group, transform or modify vector or bitmap shapes.

* * * * *